US012305989B2

(12) United States Patent
Wu et al.

(10) Patent No.: US 12,305,989 B2
(45) Date of Patent: May 20, 2025

(54) RESONATOR OPTICAL GYROSCOPE WITH DIMINISHED BIAS ERROR

(71) Applicant: Honeywell International Inc., Charlotte, NC (US)

(72) Inventors: Jianfeng Wu, Tucson, AZ (US); Tiequn Qiu, Glendale, AZ (US); Matthew Wade Puckett, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 161 days.

(21) Appl. No.: 18/166,792

(22) Filed: Feb. 9, 2023

(65) Prior Publication Data

US 2024/0271937 A1 Aug. 15, 2024

(51) Int. Cl.
*G01C 19/72* (2006.01)

(52) U.S. Cl.
CPC ......... *G01C 19/727* (2013.01); *G01C 19/721* (2013.01); *G01C 19/722* (2013.01)

(58) Field of Classification Search
CPC .... G01C 19/72; G01C 19/721; G01C 19/722; G01C 19/727
See application file for complete search history.

(56) References Cited

U.S. PATENT DOCUMENTS 4,662,751 A 5/1987 Goss et al.
4,890,922 A * 1/1990 Wilson ................. G01C 19/721
372/32
7,973,938 B2 7/2011 Qiu et al.
10,180,325 B2 1/2019 Bowers et al.
10,731,988 B1 8/2020 Paniccia et al.
(Continued)

FOREIGN PATENT DOCUMENTS

WO 03014674 A2 2/2003

OTHER PUBLICATIONS

European Patent Office, "Extended European Search Report", dated Apr. 26, 2024, from U.S. Appl. No. 18/166,792, from Foreign Counterpart to U.S. Appl. No. 18/166,792, pp. 1 through 10, Published: EP.

(Continued)

*Primary Examiner* — Michael A Lyons
(74) *Attorney, Agent, or Firm* — Fogg & Powers LLC

(57) ABSTRACT

Techniques are provided for diminishing bias error, in a resonator optical gyroscope, due to an undesired, parasitic optical mode which is orthogonal to a desired optical mode. Energy levels of the undesired, parasitic mode can be diminished utilizing polarizing beam splitters each of which suppresses energy of the undesired, parasitic mode of a clockwise or a counterclockwise optical signal more than energy of the desired mode of the CW optical signal. Optionally, one or more components of a travelling wave resonator system are configured to suppress energy of the undesired, parasitic mode of a clockwise and/or a counterclockwise optical signal more than energy of the desired mode of the respective optical signal(s). Optionally, the desired optical mode is either a transverse magnetic (TM) mode or a transverse electric (TE) mode, and the undesired, parasitic optical mode is respectively the TE mode or the TM mode.

19 Claims, 6 Drawing Sheets

(56) References Cited

U.S. PATENT DOCUMENTS

2020/0072609 A1* 3/2020 Krueger ............... G01C 19/727
2024/0271936 A1* 8/2024 Puckett ............... G01C 19/722

OTHER PUBLICATIONS

Feng, et al., "Resonant integrated optical gyroscope base on Si3N4 waveguide ring resonator", Optics Express, vol. 29, No. 26, Dec. 15, 2021, pp. 43875 through 43884.
Liu et al., "Ultrahigh Suppression Broadband Polarization Splitter Based on and Asymmetrical Directional Coupler", IEEE Photonics Journal, vol. 9, No. 5, Oct. 2017, pp. 1 through 10.
Shi et al., "Silicon photonic grating-assisted, contra-directional couplers", Optics Express, vol. 21, No. 3, Feb. 11, 2013, pp. 3633 through 3650.

* cited by examiner

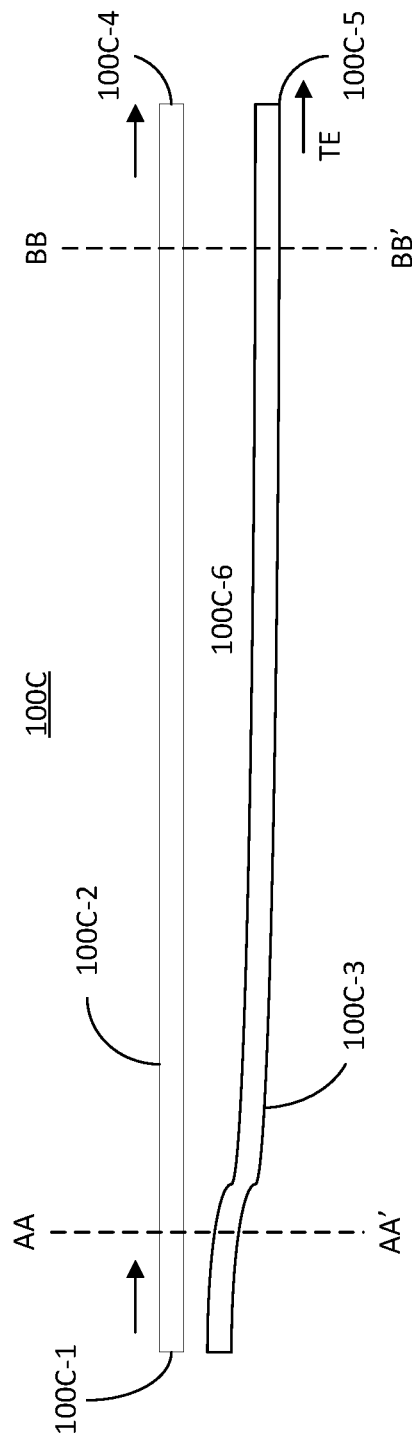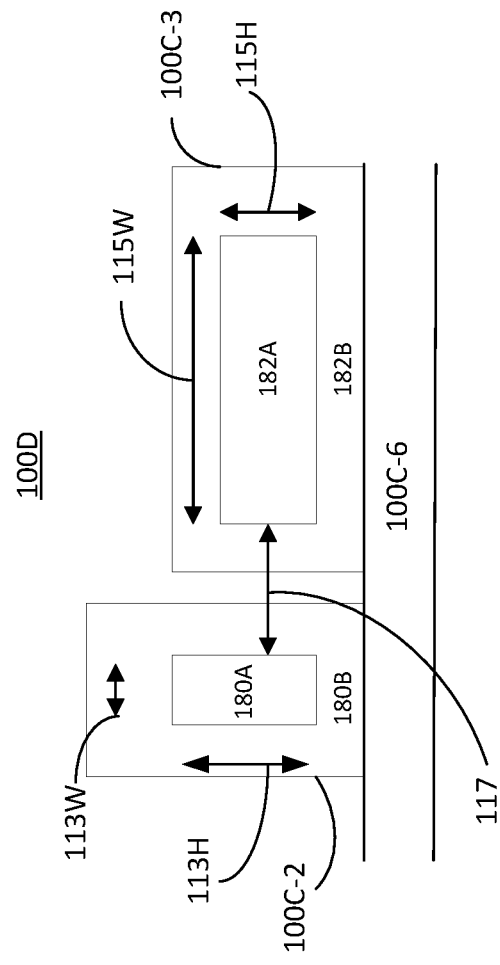

RESONATOR OPTICAL GYROSCOPE WITH DIMINISHED BIAS ERROR

STATEMENT REGARDING FEDERALLY SPONSORED RESEARCH OR DEVELOPMENT

This invention was made with Government support under PTE Federal award number 2134830 awarded by the National Science Foundation. The Government has certain rights in the invention.

BACKGROUND

Resonator optical gyroscopes typically designed to use one electromagnetic mode, i.e., a transverse electric (TE) mode or a transverse magnetic mode (TM). However, when one mode is used, the other mode (or the parasitic mode) may also exist. Because TE and TM modes have different effective indices of refraction and temperature coefficients, the existence of the parasitic mode causes a bias error in an output of the resonator optical gyroscope which may be hard to compensate for due as it varies due to numerous factors, e.g., time, temperature, stress, etc.

SUMMARY

A method is provided for reducing bias error in a resonator optical gyroscope. The method comprises: receiving, at a first polarizing beam splitter (PBS) from an optical source, a clockwise (CW) optical signal comprising a first mode and a second mode, wherein the first mode is a transverse electric (TE) mode or a transverse magnetic (TM) mode and the second mode is respectively the TM mode or the TE mode; receiving, at a second PBS from the optical source, a counterclockwise (CCW) optical signal comprising the first mode and the second mode; suppressing, with the first PBS, energy of the second mode of the CW optical signal more than energy of the first mode of the CW optical signal is suppressed by the first PBS; suppressing, with the second PBS, energy of the second mode of the CCW optical signal more than energy of the first mode of the CCW optical signal is suppressed by the second PBS; receiving, at a travelling wave resonator system from the first PBS, at least a portion of the CW optical signal with the second mode whose energy has been suppressed more than the energy of the first mode of the CW optical signal, wherein the travelling wave resonator system comprises a travelling wave resonator configured to propagate an optical signal in only one direction; receiving, at the travelling wave resonator system from the second PBS, at least a portion of the CCW optical signal with a second mode whose energy has been suppressed more than the energy of the first mode of the CCW optical signal; in response to at least a portion of the CW optical signal, with the second mode whose energy has been suppressed more than the energy of the first mode of the CW optical signal, provided by the travelling wave resonator system, adjusting a carrier frequency of the CW optical signal emitted from the optical source to equal a resonant frequency of the travelling wave resonator in a CW direction; in response to at least a portion of the CCW optical signal, with the second mode whose energy has been suppressed more than the energy of the first mode of the CCW optical signal, provided by the travelling wave resonator system, adjusting a carrier frequency of the CCW optical signal emitted from the optical source to equal a resonant frequency of the travelling wave resonator in a CCW direction; and in response to either (a) a portion of the CW optical signal, with the second mode whose energy has been suppressed more than the energy of the first mode of the CW optical signal received from the first PBS, and a portion of the CCW optical signal, with the second mode whose energy has been suppressed more than the energy of the first mode of the CCW optical signal received from the second PBS, or (b) a portion of the CW optical signal, with the second mode whose energy has been suppressed more than the energy of the first mode of the CW optical signal, received from the travelling wave resonator system, and a portion of the CCW optical signal, with the second mode whose energy has been suppressed more than the energy of the first mode of the CCW optical signal, received from the travelling wave resonator system, determining a rate of rotation of the resonator optical gyroscope around a center axis of the travelling wave resonator.

A resonator optical gyroscope, mounted over a surface of a substrate, is provided. The resonator optical gyroscope comprises: an optical source configured to provide a clockwise (CW) optical signal and a counterclockwise (CCW) optical signal, wherein each of the CW optical signal and the CCW optical signal comprise a first mode and a second mode, wherein the first mode is a transverse electric (TE) mode or a transverse magnetic (TM) mode and the second mode is respectively the TM mode or the TE mode; a first polarizing beam splitter (PBS) optically coupled to the optical source, configured to receive the CW optical signal, and configured to suppress energy of the second mode of the CW optical signal more than energy of the first mode of the CW optical signal; a second polarizing beam splitter optically coupled to the optical source, configured to receive the CCW optical signal, and configured to suppress energy of the second mode of the CW optical signal more than energy of the first mode of the CW optical signal; a travelling wave resonator system comprising a first planar optical transmission line, a second planar optical transmission line, a travelling wave resonator, a first port optically coupled to a first end of the first planar optical transmission line, a second port optically coupled to a second end of the first planar optical transmission line, a third port optically coupled to a first end of a second optical transmission line, and a fourth port optically coupled to a second end of the second optical transmission line, wherein the travelling wave resonator is configured to propagate an optical signal in only one direction, wherein the first port is optically coupled to the first PBS, and wherein the second port is optically coupled to the second PBS; a CW detector circuit optically coupled to the third port and configured to provide a CW control signal to the optical source; a CCW detector circuit optically coupled to the fourth port configured to provide a CCW control signal to the optical source; wherein in response to the CW control signal, the optical source is further configured to adjust a carrier frequency of the CW optical signal to equal to a resonant frequency of the travelling wave resonator in a CW direction and use the CCW control signal to adjust a carrier frequency of the CCW optical signal to equal a resonant frequency of the travelling wave resonator in a CCW direction; and a beat detector circuit either (a) optically coupled to the first port and the second port and configured to receive a portion of the CW optical, with the second mode whose energy has been suppressed more than the energy of the first mode of the CW optical signal received from the first PBS and to receive a portion of the CCW optical signal, with the second mode whose energy has been suppressed more than the energy of the first mode of the CW optical signal, received from the second PBS or (b) optically coupled to the third port and the fourth port and configured to receive a portion of a CW optical signal, with the second mode whose energy has been suppressed more than the energy of the first mode of the CW optical signal, received from the third port and a portion of a CCW optical signal, with the second mode whose energy has been suppressed more than the energy of the first mode of the CW optical signal, received from the fourth port, and further configured to determine a rate of rotation of the resonator optical gyroscope around a rotation axis based upon a difference of a carrier frequency of a portion of the CW optical signal received by the beat detector circuit and a carrier frequency of a portion of the CCW optical signal received by the beat detector circuit.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 1C illustrates a plan view of one embodiment of a polarizing beam splitter;

FIG. 1D illustrates Figure a cross-sectional view of one embodiment of a polarizing beam splitter;

Figure 1A:
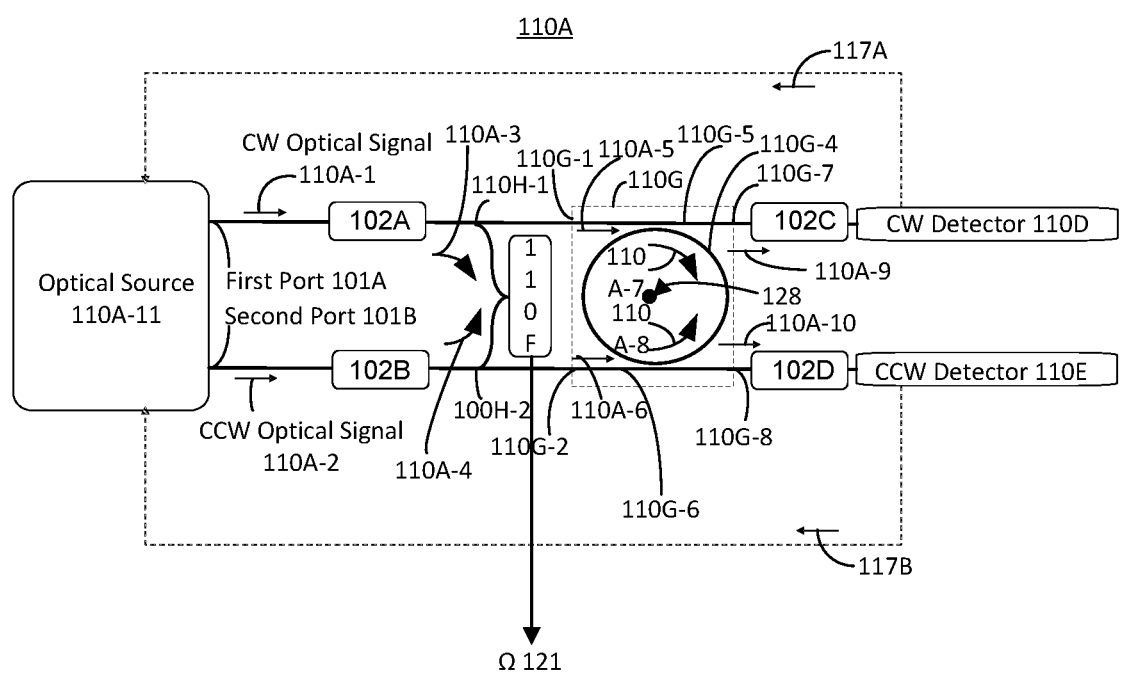
FIG. 1A illustrates a block diagram of one embodiment of a resonator optical gyroscope including at least two polarization beam splitters each of which is configured to pass energy of the first electromagnetic mode (which is desired) and suppress energy of the second electromagnetic mode which (is undesired and parasitic, and) is orthogonal to the first electromagnetic mode.

In accordance with common practice, the various described features are not drawn to scale but are drawn to emphasize specific features relevant to the exemplary embodiments.

Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A resonator optical gyroscope comprising at least two polarization beam splitters[1] (PBSs) each of which is configured to pass energy of a first electromagnetic mode (which is desired) and

[1] Polarization beam splitter (PBS) means an optical circuit, including an optical coupler which includes a first port, a second port, and a third port, configured to receive, at the first port, an optical signal, including energy in a first electromagnetic mode and energy in a second electromagnetic mode orthogonal to the first electromagnetic mode, providing, at the second port, a first portion of the optical signal including energy in the first electromagnetic mode and energy in the second electromagnetic mode where the ratio of energy in the first electromagnetic mode to energy in the second electromagnetic mode exceeds one (e.g., is at least thirty decibels), and providing, at the third port, a second portion of the optical signal including energy in the first electromagnetic mode and energy in the second electromagnetic mode where the ratio of energy in the second electromagnetic mode to energy in the first electromagnetic mode exceeds one (e.g., is at least thirty decibels).

suppress energy of a second electromagnetic mode which (is undesired and parasitic and) is orthogonal to the first electromagnetic mode.[2] The first electromagnetic mode and the second electromagnetic mode may be respectively a TE mode and a TM mode, or vice versa.

[2] A port of the PBS which provides a level of energy of an undesired, parasitic mode of the optical signal may be configured to radiate such energy into free space or into absorptive material which dissipates the energy.

Optionally, the ratio of energy of the first mode with respect to the second mode (i.e., the extinction ratio), provided at an output of a polarization beam splitter), is at least 30 decibels (dB). Each of two of the at least two polarization beam splitters are inserted respectively (a) between a first output port of an optical source and a first input port of a travelling wave resonator system and (b) between a second output port of the optical source and a second input port of the travelling wave resonator system. By suppressing the undesired, parasitic second electromagnetic mode with the at least two polarization beam splitters, the at least two polarization beam splitters in the resonator optical gyroscope diminish bias error in an output of the resonator optical gyroscope. Optionally, one or more additional polarization beam splitters may be utilized, where each additional polarization beam splitter is optically coupled between an output port of the travelling wave resonator system and a detector configured to determine incident optical power level of a clockwise or counterclockwise signal emitted from the traveling wave resonator.

The travelling wave resonator system includes a travelling wave resonator. A travelling wave resonator means a resonator in which an optical signal propagates in only one direction, e.g., clockwise or counterclockwise around the travelling wave resonator. Types of travelling wave resonators include disc, ring, and racetrack resonators.

Optionally, the resonator optical gyroscope comprises four polarization beam splitters. Each of the additional two polarization beam splitters are inserted respectively (a) between a first output port of the travelling wave resonator system and a first optical signal detector and (b) between a second output port of the travelling wave resonator system. By further suppressing the undesired, parasitic second electromagnetic mode with the additional two polarization beam splitters, the additional two polarization beam splitters in the resonator optical gyroscope further diminish the bias error in an output of the resonator optical gyroscope.

The travelling wave resonator system comprises optical waveguide and a travelling wave resonator. The optical waveguide is configured to couple optical energy into and out of the travelling wave resonator. Optionally, the optical waveguide and/or the travelling wave resonator are configured to pass energy of the first electromagnetic mode and suppress energy of the second electromagnetic mode.

Figure 1B:
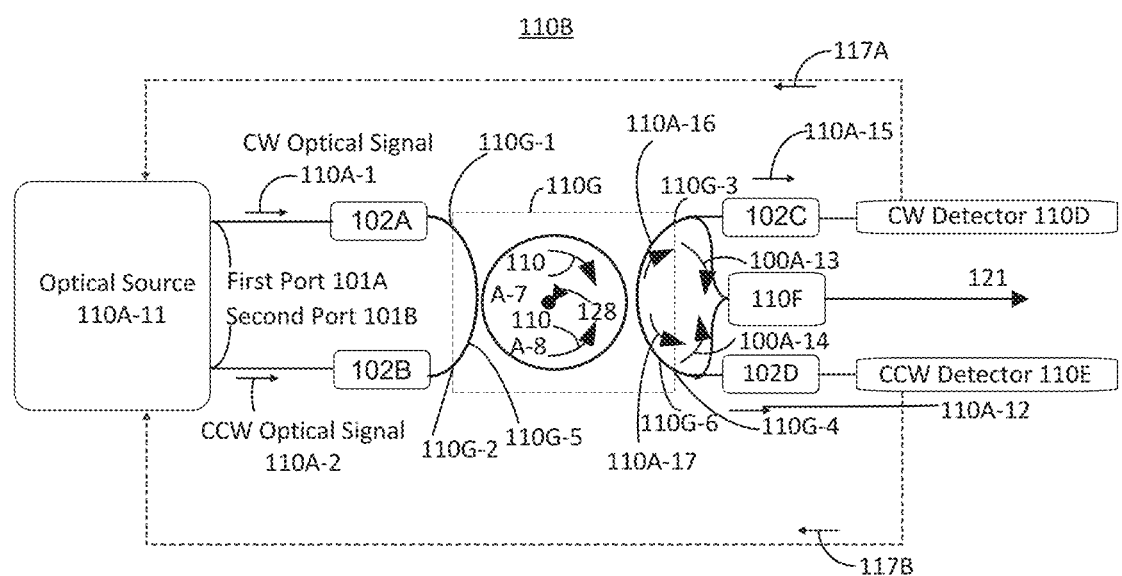
FIG. 1B illustrates a block diagram of another embodiment of a resonator optical gyroscope including at least two polarization beam splitters (resonator optical gyroscope) each of which is configured to pass energy of the first electromagnetic mode (which is desired) and suppress energy of the second electromagnetic mode which (is undesired and parasitic)

FIG. 1A illustrates a block diagram of one embodiment of a resonator optical gyroscope including at least two polarization beam splitters (resonator optical gyroscope) 110A each of which is configured to pass energy of the first electromagnetic mode (which is desired) and suppress energy of the second electromagnetic mode which (is undesired and parasitic, and) is orthogonal to the first electromagnetic mode. The resonator optical gyroscope 110A includes a center axis (or rotation axis) 128 around which the resonator optical gyroscope 110A may rotate. FIG. 1B illustrates a block diagram of another embodiment of a resonator optical gyroscope including at least two polarization beam splitters (resonator optical gyroscope) 110B each of which is configured to pass energy of the first electromagnetic mode (which is desired) and suppress energy of the second electromagnetic mode which (is undesired and parasitic, and) is orthogonal to the first electromagnetic mode; FIG. 1B will be subsequently described.

Returning to FIG. 1A, the resonator optical gyroscope 110 also includes an optical source 110A-11, a first PBS 102A, a second PBS 102B, clockwise optical signal detector (CW detector or CW detector circuit) 110D, a counterclockwise optical signal detector (CCW detector or CCW detector circuit) 110E, a beat detector (or beat detector circuit) 110F, and a travelling wave resonator system 110G. Optionally, the beat detector 110F may be implemented with optical, analog, and/or digital electronic circuitry. Optionally, the optical source 110A-11 includes one or more lasers.

Optionally, the optical source 110A-11 includes one or more lasers. The optical source 110A-11 is configured to generate a clockwise (CW) optical signal 110A-1 and a counterclockwise (CCW) optical signal 110A-2. The optical source 110A-11 includes a first port 101A and a second port 101B. The optical source 110A-11 is configured to provide a CW optical signal 110A-1 and a CCW optical signal 110A-2 respectively from the first port 101A and the second port 101B. Each of the first port 101A and the second port 101B, of the optical source 110A-11, are configured to be optically coupled, to the travelling wave resonator system 110G, respectively through the first PBS 102A and the second PBS 102B. The first PBS 102A is configured to receive the CW optical signal 110A-1 and diminish the energy of the undesired, parasitic second electromagnetic mode with respect to the energy of the desired first electromagnetic mode. The second PBS 102B is configured to receive the CCW optical signal 110A-2 and diminish the energy of the undesired, parasitic second electromagnetic mode with respect to the energy of the desired first electromagnetic mode.

Each of the first PBS 102A and the second PBS 102B diminishes energy of the undesired second electromagnetic mode. An optional embodiment of a PBS is illustrated in Liu et al., "Ultrahigh Suppression Broadband Polarization Splitter Based on an Asymmetrical Directional Coupler," I.E.E.E. Photonics Journal, Vol. 9, No. 5, October 2017, which is hereby incorporated by reference herein in its entirety. PBSs may be implemented in other ways.

FIG. 1C illustrates a plan view of one embodiment of a polarizing beam splitter (PBS) 100C. The illustrated PBS 100C includes an input port 100C-1 (of a first planar optical waveguide 100C-2) configured to receive an input signal. The input signal includes the first electromagnetic mode and optionally includes the second electromagnetic mode. The illustrated PBS 100C further includes a second optical waveguide 100C-3. Each of the first planar optical waveguide 100C-2 and the second planar optical waveguide 100C-3 is formed on a substrate 100C-6. Optionally, the substrate is an insulator such as undoped silicon, glass, or another insulator.

The first planar optical waveguide 100C-2 is configured to initially support both TE and TM modes, e.g., at the input 100C-1 through a first portion of first planar optical waveguide 100C-2. Optionally, the first port of the first planar optical waveguide 100C-2 is from the input 100C-1 through about cut line AA-AA' through the first planar optical waveguide 100C-2. The first portion of the first planar waveguide 100C-2 is configured to optically couple energy of a second electromagnetic mode, e.g., the TE or the TM mode to a first portion of the second planar optical waveguide 100C-3 adjacent to the first portion of the first planar optical waveguide 100C-2. Optionally, the first portion of the second planar optical waveguide 100C-3 is from the end of the second planar optical waveguide adjacent to the input 100C-1 through about cut line AA-AA' through the second planar optical waveguide 100C-3. A second portion of the first planar optical waveguide 100C-2 is configured to convey propagate substantially only a first electromagnetic mode. The second planar optical waveguide 100C-2 is configured to propagate substantially only a second electromagnetic mode. A first output 100C-4 of the PBS 100C (which is an output of the first planar optical waveguide 100C-1) is configured to output substantially only the first electromagnetic mode. A second output 100C-5 of the PBS 100C (which is an output of the second planar optical waveguide 100C-2) is configured to output substantially only the second electromagnetic mode. Optionally, a ratio of a desired, first electromagnetic mode with an undesired, second electromagnetic mode at each of the first output 100C-4 and the second output 100C-5 is at least 30 decibels. The output which is configured to emit energy of the undesired second electromagnetic mode off away from the planar optical gyroscope, e.g., substantially or not substantially parallel to the substrate 100C-6.

FIG. 1D illustrates a cross-sectional view of one embodiment of a polarizing beam splitter 100D. In the illustration of FIG. 1D, the first planar optical waveguide 100C-2 is configured to propagate substantially only energy of a TM mode. Optionally, energy of a TE mode is suppressed by at least 30 decibels with respect to the energy of the TM mode. To do so, a height (or thickness) 113H of a core of the first planar optical waveguide 100C-2 is greater than a width 113W of the first planar optical waveguide 100C-2. In the first portion of the first planar optical waveguide 100C-2, e.g., at cut line AA-AA', the height 113H of the core may be slightly larger than the width 113W of the core (e.g., with a ratio of 4:3). In the remaining portion of the first planar optical waveguide 100C-2, e.g., at cut line BB-BB', the radio of height 113H to width 113W is increased (e.g., with a ratio of 2:1).

The first planar optical waveguide 100C-2 includes a core 180A surrounded by cladding 180B. The second planar optical waveguide 100C-3 includes a core 182A surrounded by cladding 182B. Optionally, the core is silicon nitride and the cladding is silicon dioxide.

In the illustration of FIG. 1D, the second planar optical waveguide 100C-3 is configured to propagate substantially only energy of a TE mode (i.e., energy of a TM mode is suppressed more than energy of the TE mode in the second planar optical waveguide 100C-3). Optionally, energy of a TM mode is suppressed by at least 30 decibels with respect to the energy of the TE mode. To do so, a core width 115W is larger than a core height (or thickness) 115H (e.g., with a ratio of 2:1) of the second planar optical waveguide 100C-3.

In the illustration of FIG. 1D, the first planar optical waveguide 100C-2 is configured to propagate substantially only energy of a TM mode (i.e., energy of the TE mode is suppressed more than energy of the TM mode in the first planar optical waveguide 100C-2). Optionally, energy of a TE mode is suppressed by at least 30 decibels with respect to the energy of the TM mode. To do so, a core height (or thickness) 113H 115W is larger than a core width (e.g., with a ratio of 2:1) of the first planar optical waveguide 100C-2.

A core separation distance 117 between adjacent sidewalls of the cores of the first planar optical waveguide 100C-2 and the second planar optical waveguide 100C-3 varies. Optionally, the core separation distance between adjacent sidewalls of first portions, e.g., at the cut line AA-AA', of both planar optical waveguides may be separated by as little as less than a free space wavelength of the optical signal configured to be propagated in the PBS. Optionally, the core separation distance between adjacent sidewalls of second portions, e.g., at the cut line BB-BB', of both planar optical waveguides may be separated by more than a free space wavelength of the optical signal configured to be propagated in the PBS.

Returning to FIG. 1A, the beat detector 110F is optically coupled, e.g., with optical couplers 110H-1, 110H-2, to each an output, of the first PBS 102A and the second PBS 102B. The output of the first PBS 102A is configured to provide a s CW optical signal having energy of the undesired, parasitic second electromagnetic mode which is substantially diminished, e.g., by at least 30 dB, with respect to energy of the desired first electromagnetic mode. The output of the second PBS 102B is configured to provide a CCW optical signal having energy of the undesired, parasitic second electromagnetic mode which is substantially diminished, e.g., by at least 30 dB, with respect to energy of the desired first electromagnetic mode.

A second portion of the CW optical signal 110A-3 is optically coupled through a first optical coupler 100H-1 to the beat detector 110F. A second portion of the CCW optical signal 110A-4 is optically coupled through a second optical coupler 100H-2 to the beat detector 110F.

A first portion of the CW optical signal 110A-5 is optically coupled to a first port 110G-1 of the travelling wave resonator system 110G and to a first planar optical transmission line 110G-5. A first portion of the CCW optical signal 110A-6 is optically coupled to a second port of the travelling wave resonator system 110G and to a second planar optical transmission line 110G-6.

The travelling wave resonator system 110G includes the first port 110G-1, the second port 110G-2, a third port 110G-3, and a fourth port 110G-4. The first port 110G-1 of the travelling wave resonator system 110G is optically connected to the aforementioned output of the first PBS 102A. The second port 110G-1 of the travelling wave resonator system 110G is optically connected to the aforementioned output of the second PBS 102B.

The CW detector 1101D is optically coupled to the third output port 110G-3 of the travelling wave resonator system 110G. The CCW detector 110E is optically coupled to the fourth output port 110G-4 of the travelling wave resonator system 110G. Optionally, a third PBS 102C is respectively optically coupled between the third output port 110G-3 of the travelling wave resonator system 110G. Optionally, a fourth PBS 102D is respectively optically coupled between the fourth output port 110G-4 of the travelling wave resonator system 110G. Use of the third PBS 102C and/or the fourth PBS 102D further suppresses the energy of the undesired second electromagnetic mode. Each of the CW detector 110D and the CCW detector 110E is electrically coupled to the optical source 110A-11.

The travelling wave resonator system 110G includes a travelling wave resonator 110G-4, a first planar optical transmission line 110G-5, and a second planar optical transmission line 110G-6. Optionally, a portion of a sidewall of the first planar optical transmission line 110G-5 is substantially parallel to a portion of a sidewall of the travelling wave resonator system 110G. Optionally, a portion of a sidewall of the second planar optical transmission line 110G-6 is substantially parallel to a portion of a sidewall of the travelling wave resonator system 110G.

A first coupled portion 110A-7 of the first portion of the CW optical signal 110A-5 is optically coupled from the first planar optical transmission line 110G-5 to the travelling wave resonator 110G-4, and circulates clockwise around the travelling wave resonator 110G-4. A second coupled portion 110A-8 of the first portion of the CCW optical signal 110A-6 is optically coupled from the second planar optical transmission line 110G-6 to the travelling wave resonator 110G-4, and circulates counterclockwise around the travelling wave resonator 110G-4.

Optionally and to further increase the ratio of energy of the first mode with respect to the second mode in the resonator optical gyroscope 110A, the travelling wave resonator system 110G, or one or more components thereof (e.g., the travelling wave resonator 110G-4, the first planar optical transmission line 110G-5, and/or the second planar optical transmission line 110G-6) can be configured to suppress energy of the undesired, parasitic second electromagnetic mode (i.e., the TE or the TM mode). If the undesired, parasitic second electromagnetic mode is the TM mode, then the components of the travelling wave resonator system 110G (e.g., the travelling wave resonator 110G-4, the first planar optical transmission line 110G-5, and/or the second planar optical transmission line 110G-6) can be implemented with planar optical waveguide whose width is greater than its thickness. If the undesired, parasitic second electromagnetic mode is the TE mode, then the components of the travelling wave resonator system 110G (e.g., the travelling wave resonator 110G-4, the first planar optical transmission line 110G-5, and/or the second planar optical transmission line 110G-6) can be implemented with planar optical waveguide (a) whose width is less than its thickness or (b) as subsequently described below.

Figure 2:
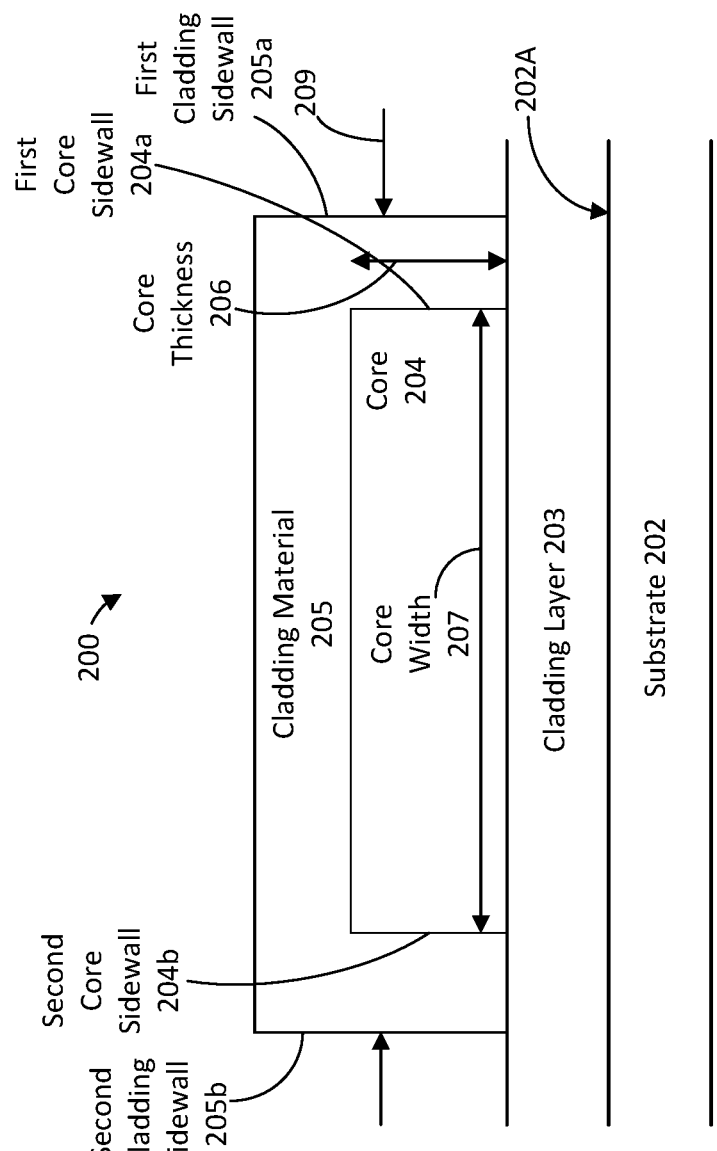
FIG. 2 illustrates a cross section of one embodiment of a planar optical waveguide configured to support a transverse magnetic (TM), e.g., TM0, mode whilst suppressing energy of transverse electric (TE) modes (TMWG)

FIG. 2 illustrates a cross section of one embodiment of a planar optical waveguide configured to support a TM, e.g., TM0, mode whilst suppressing energy of TE modes (or TMWG) 200. The TMWG 200 includes a core 204, cladding material 205, and a cladding layer 203. The TMWG 200 is formed on a substrate 202, e.g., over a surface 202A of the substrate. The cladding layer 203 is deposited or formed on (or over) the substrate 202 which mechanically supports the TMWG 200. Optionally, the substrate 202 for example an insulator for example undoped silicon or glass.

The core 204 is formed on (or over) the cladding layer 203. The core 204 has a core thickness (or core height) 206 and a core width 207. The core 204 also has a first core sidewall 204a and a second core side wall 204b which are each substantially orthogonal to the substrate 202. Optionally, the core 204 comprises silicon nitride; however, other materials can be used to form the core 204.

The cladding material 205 is deposited or formed on (or over) the core 204, and on (or over) the cladding layer 203. The cladding material 205 also has a first cladding sidewall 205a and a second cladding sidewall 205b which are each substantially orthogonal to the substrate 202.

The cladding material 205 and the cladding layer 203 may be jointly referred to as cladding. Optionally, each of the cladding material 205 and the cladding layer 203 include silicon dioxide; however, other material(s) can be used to form each of the cladding material 205 and/or the cladding layer 203. The index of refraction of the cladding must be lower than the index of refraction of the core 204 to permit optical signals to be substantially confined within the TMWG 200, e.g., within the cladding; an optical signal propagating in the TMWG 200 is configured to be substantially confined within the cladding.

The TMWG 200 has a width 209 which is a distance between a first cladding sidewall 205a and a second cladding sidewall 205b. Optionally, to suppress TM modes higher than the TM0 mode, the core width 207 is less than seven free space wavelengths of the optical signal configured to be propagated in the TMWG 200.

Embodiments of the invention may be a travelling wave resonator formed with TMWG 200 and Bragg gratings in at least one sidewall 204a, 204b of the core 204 of the TMWG 200 (collectively "TWRBG"). Examples of such TWRBG are a disc resonator formed with TMWG 200 and a Bragg grating in a sidewall 204a, 204b of the core 204 of the TMWG 200, a ring resonator formed with TMWG 200 and a Bragg grating in one or both sidewalls of the core 204 of the TMWG 200, or a racetrack resonator formed with TMWG 200 and a Bragg grating in one or both sidewalls of a core 204 of the TMWG 200. A racetrack resonator includes two halves of a ring resonator joined by two substantially straight portions TMWG 200.

The TWRBG has lower loss than conventional optical planar waveguide utilized to convey optical energy in a TE mode. If the resonator optical gyroscope 110A utilizes a travelling wave resonator made with TWRBG, it will have lower energy dissipation, and thus a higher Q factor and finesse value. Thus, such a resonator optical gyroscope can detect smaller changes in rotation rate of the travelling wave resonator, i.e., provide a lower angle random walk.

The Bragg gratings in sidewall(s) of the core of a TMWG 200 suppresses TE modes, including the TE0 mode, by creating optical loss for TE modes. Firstly, the Bragg grating period is greater than a free space wavelength of an optical signal configured to propagate in the travelling wave resonator (or the planar optical waveguide thereof) divided by two times an index of refraction of the TE, e.g., the TE0, mode. This causes electromagnetic energy of the TE mode(s) to be radiated (i.e., reflected in mode(s) that are lossy) by the Bragg grating in the sidewall(s) of the core. Secondly, the Bragg grating period is also less than the free space wavelength of the optical signal configured to propagate in the travelling wave resonator (or the planar optical waveguide thereof) divided by two times an index of refraction of the TM, e.g., the TM0, mode. This prevents the electromagnetic energy of the TM mode(s) from being radiated (i.e., not reflected in mode(s) that are lossy) by the Bragg grating in the sidewall(s) of the core; thus, the Bragg grating allows the TM mode(s) to propagate in the planar optical waveguide of the travelling wave resonator. The Bragg grating depth is selected to provide a sufficient attenuation, e.g., greater than or equal to 60 decibels (dB), of the TE mode(s). The Bragg grating depth is proportional to a level of attenuation of the TE mode(s).

Figure 3B:
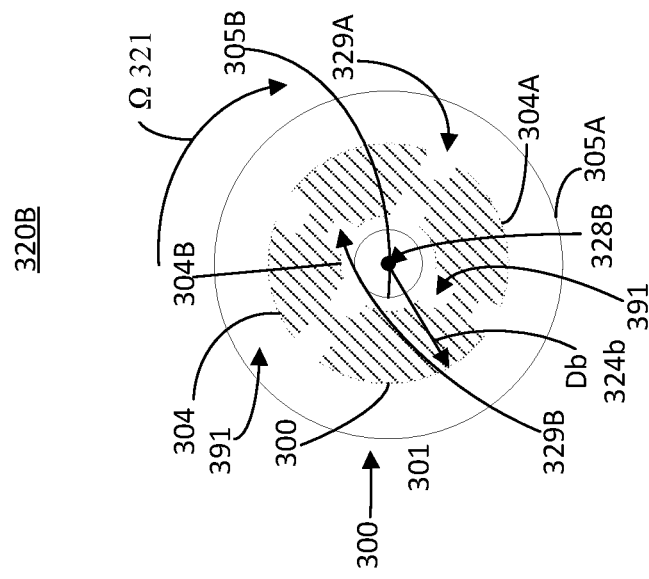
FIG. 3B illustrates a plan view of one embodiment of a ring resonator formed with TMWG and a first Bragg grating in an exterior core sidewall of the core and/or a second Bragg grating in an interior core sidewall of the core.
Figure 3A:
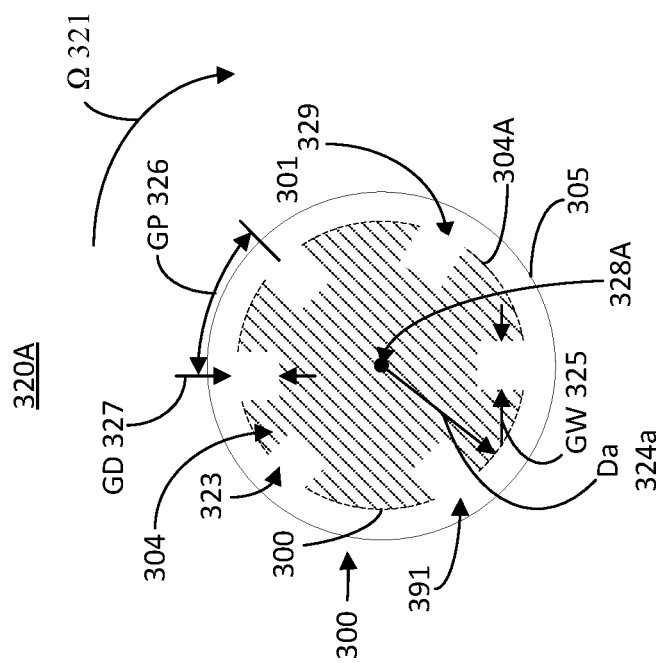
FIG. 3A illustrates a plan view of one embodiment of a disc resonator formed with TMWG and a Bragg grating n an exterior core sidewall of the core of the TMWG.

FIG. 3A illustrates a plan view of one embodiment of a disc resonator formed with TMWG 200 and a Bragg grating 329 in an exterior core sidewall 304A of the core 304 of the TMWG 200 (collectively DRTMWG 320A). The DRTMWG 320A has an exterior surface 305 which is an exterior surface of cladding. The core 304 is covered by cladding 391. The DRTMWG 320A comprises TMWG 300 formed with a cross-sectional shape of a disc over a substrate 301. The Bragg grating 329 includes more than one grating elements 323 in the exterior core sidewall 304A. Each grating element 323 may have sides that are substantially perpendicular or curved, e.g., scalloped. For pedagogical purposes, the Bragg grating elements 323 illustrated in FIGS. 3A and 3B are illustrated to have sides which are substantially perpendicular. Optionally, each grating element 323 has a grating depth (GD) 327 and a grating width (GW) 325. For the embodiments described herein, each Bragg grating 329 in a sidewall (of the core of the TMWG 300) has a Bragg grating period (GP) 326. For purposes of clarity, the Bragg grating period 326 between each Bragg grating element is substantially equal. The DRTMWG 320A also includes a center axis (or rotation axis) 328A around which a gyroscope (including the DRTMWG 320A) may be rotated at a rate of rotation (Q) 321. The core 304 has a diameter Da 324a (from the center axis 328A to the exterior core sidewall 304A).

FIG. 3B illustrates a plan view of one embodiment of a ring resonator formed with TMWG 200 and a first Bragg grating 329A in an exterior core sidewall 304A of the core 304 and/or a second Bragg grating 329B in an interior core sidewall 304B of the core 304 (collectively RTMWG 320B). Cladding 391 has an exterior cladding sidewall 305A and an interior cladding sidewall 305B. The core 304 has a diameter Db 324b (from a center axis (or rotation axis) 328B to the exterior core sidewall 305A). For pedagogical purposes, FIG. 3B illustrates a first Bragg grating 329A in the exterior core sidewall 304A and a second Bragg grating 329B in the interior core sidewall 304B. Each of the first and the second Bragg gratings 329A, 329B may be implemented as described elsewhere herein. The RTMWG 320B also includes the center axis 328B around which a gyroscope may be rotated at a rate of rotation (Q) 321. The RTMWG 320B has an outer diameter Db 324b (from the center axis 328B to the exterior cladding sidewall 304A).

A racetrack resonator formed with TMWG 200 includes a first Bragg grating in a first core sidewall and/or a second Bragg grating in a second core sidewall. The racetrack resonator formed with TMWG 200 and including the first Bragg grating in the first core sidewall and/or the second Bragg grating in the second core sidewall also includes a center axis around which such racetrack resonator may be rotated at a rate of rotation (Q). The mode of the optical signal is weakly or strongly confined to the cores of the resonators, e.g., illustrated in FIGS. 3A and 3B.

Returning to FIG. 1A, a third coupled optical signal 110A-9 is optically coupled from the travelling wave resonator 110G-4 to the first planar optical transmission line 110G-5 towards a third port 110G-7 of the travelling wave resonator system 110G. The third coupled optical signal 110A-9 is transmitted from the third port 110G-7 of the traveling wave resonator system 110G to the CW detector 110D. The CW detector 110D is optically coupled to the third port 110G-7.

A fourth coupled optical signal 110A-10 is optically coupled from the travelling wave resonator 110G-4 to the second planar optical transmission line 110G-6 towards a fourth port 110G-8 of the travelling wave resonator system 110G. The fourth coupled optical signal 110A-10 is transmitted from the fourth port 110G-8 of the traveling wave resonator system 110G to the CCW detector 110E. The CCW detector 110E is optically coupled to the fourth port 110G-8.

Optionally and to further increase the ratio of energy of the first mode with respect to the second mode in the resonator optical gyroscope 110A, (a) a third PBS 102C is optically coupled between the third port 100G-7 and the CW detector 110D and/or (b) a fourth PBS 102D is optically coupled between fourth port 110G-8 and the CCW detector 110E. If the third PBS 102C is used, the third PBS 102C filters (in a manner described elsewhere herein) the third coupled optical signal 110A-9 received by the third PBS 102C, and provides a filtered first coupled optical signal to the CW detector 110D. If the fourth PBS 102D is used, the fourth PBS 102D filters (in a manner described elsewhere herein) the fourth coupled optical signal 110A-10 received by the fourth PBS 102D, and provides a filtered second coupled optical signal to the CCW detector 110E.

Optionally, each of the CW detector 110D and the CCW detector 110E may be a detector, e.g., a photodiode, configured to determine incident optical power level. Each of the CW detector 110D and the CCW detector 110E is coupled to the optical source 110A-11. The CW detector 110D provides a CW control signal 117A to the optical source 110A-11 indicative of a power level of the optical power level, e.g., of the third coupled optical signal 110A-9 or the filtered first coupled optical signal, incident on the CW detector 110D. The CCW detector 110E provides a CCW control signal 117B to the optical source 110A-11 indicative of a power level of the optical power level, e.g., of the fourth coupled optical signal 110A-10 or the filtered second coupled optical signal, incident on the CCW detector 110E.

When the resonator optical gyroscope 110 is rotated around its center axis 128, the resonant frequencies of the travelling wave resonator 110G-4 in each of the CW and CCW directions are separated (or become different) due to the Sagnac effect. The optical source 110A-11 is configured to use the CW control signal 117A to adjust a carrier frequency of the CW optical signal 110A-1 to be equal to the resonant frequency of the travelling wave resonator 110G-4 in the CW direction including accounting for changes in the resonant frequency due to a rotation rate (Ω) 121 around the center axis 128. The optical source 110A-11 is configured to use the CCW control signal 17B to adjust a carrier frequency of the CCW optical signal 110A-2 to be equal to the resonant frequency of the travelling wave resonator 110G-4 in the CCW direction including accounting for changes in the resonant frequency due to the rotation rate 121 around the center axis 128. Optionally, the technique for adjusting the carrier frequency of each of the CW and CCW optical signals, utilizes a Pound-Drever-Hall technique.

The beat detector 110F is configured to determine a rate of rotation 121 around the center axis 128 of the travelling wave resonator 110G-4. The rate of rotation 321 is a function of a difference (or beat), Δf, of a carrier frequency of the second portion of the CW optical signal 110A-3 and a carrier frequency of the second portion of the CCW optical signal 110A-4. Optionally, for a ring or a disc resonator, the rate of rotation 321 may also be a function of dimensions of the travelling wave resonator 110G-4, e.g., a diameter, e.g., the core diameter D 324a, 324b, of the travelling wave resonator 110G-4 (e.g., the TWRBG), an average wavelength, λ, of the CW optical signal 110A-1 and the CCW optical signal 110A-2, and a refractive index, n, of the travelling wave resonator 110G-4 (e.g., the TWRBG, for example, of the cladding in the travelling wave resonator 110G-4, e.g., the TWRBG). For each of the travelling wave ring resonator and the travelling wave disc resonator, the rate of rotation 121 around the rotation axis 128 of the travelling wave resonator 110G-4 is:

$$\Omega = (\Delta f * n * \lambda)/D$$

Equations for other travelling wave resonators, e.g., a racetrack resonator, may differ.

Returning to FIG. 1B, the resonator optical gyroscope 110B illustrated in FIG. 1B is similar to the resonator optical gyroscope of FIG. 1A except the travelling wave resonator system 110G is coupled differently so that:

(i) one port of the first optical transmission line 100G-5 is optically coupled to the first PBS 102A and is configured to receive a filtered CW optical signal from the first PBS 102A and that another port of the first optical transmission line 100G-5 is optically coupled to the second PBS 102A and is configured to receive a filtered CCW optical signal from the first PBS 102A);

(ii) one port of the second optical transmission line 100G-6 is optically coupled to the CW detector 110D, e.g., optionally through the optional third PBS 102C, and is configured to provide the CW detector 110D a first portion 110A-15 of the third coupled optical signal 110A-16 (or a filtered first portion of the third coupled optical signal if the optional third PBS 102C is utilized) and that another port of the second optical transmission line 100G-6 is optically coupled to the CCW detector 110E, e.g., optionally through the optional fourth PBS 102D, and is configured to provide the CCW detector 110E a first portion 110A-12 of the fourth coupled optical signal 110A-17[[0]](or a filtered first portion of the fourth coupled optical signal if the optional fourth PBS 102D is utilized); and (iii) the beat detector 110F is optically coupled, e.g., through optical couplers), to each of the third port 110G-3 and the fourth port 110G-4 of the travelling wave resonator 110G; thus, the beat detector 110F is configured to receive a second portion 100A-13 of the third coupled optical signal 110A-16 and a second portion 100A-13 of the fourth coupled optical signal 110A-17.

The optional embodiments described with respect to the travelling wave resonator system 110G, the third PBS 102C, and the fourth PBS 102D with respect to the resonator optical gyroscope of FIG. 1A, are also optional embodiments for the resonator optical gyroscope of FIG. 1B.

Figure 4:
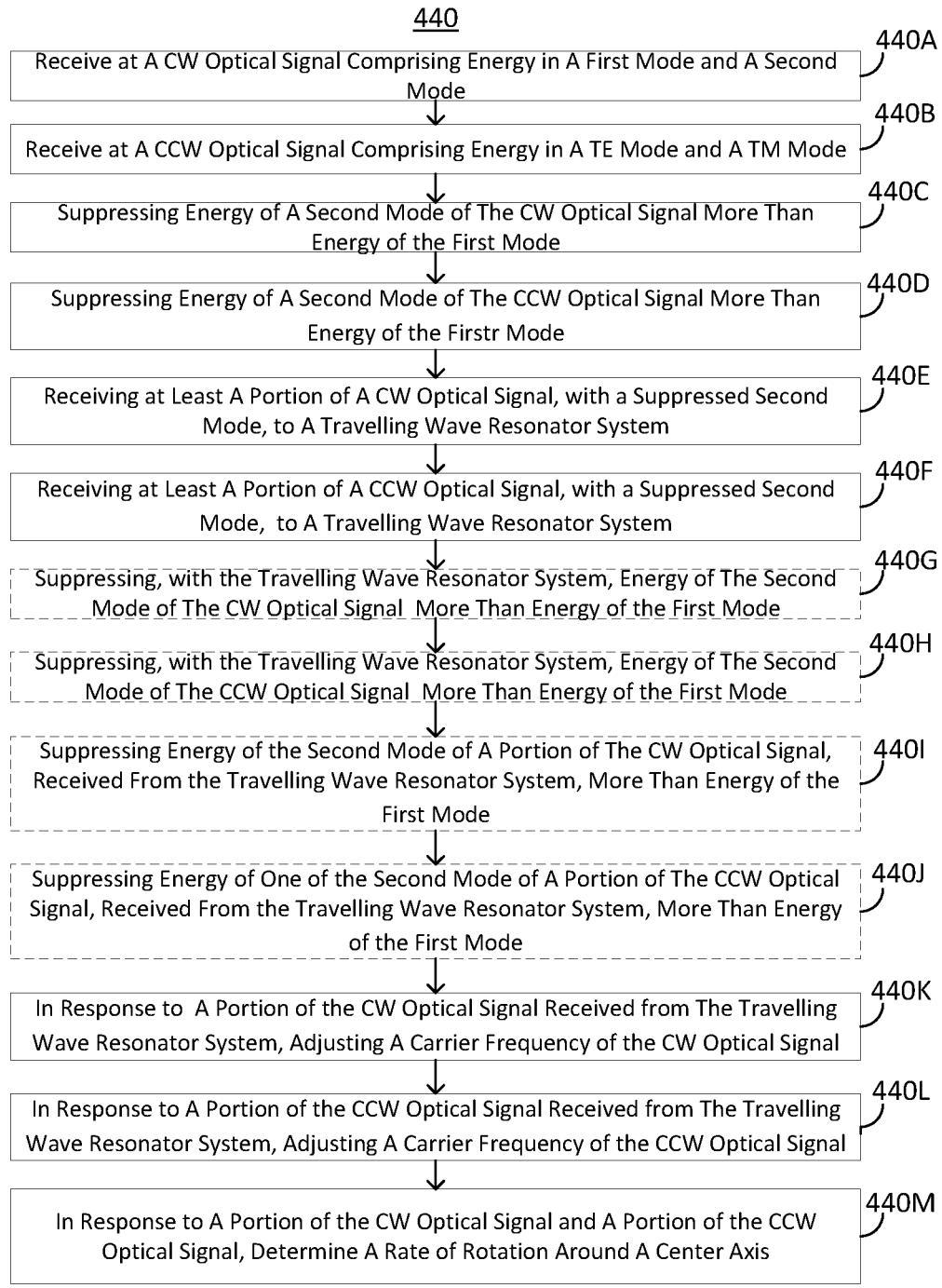
FIG. 4 illustrates a flow diagram of one embodiment of a method of operation of a resonator optical gyroscope including at least two polarization beam splitters (resonator optical gyroscope) each of which is configured to suppress energy of the first electromagnetic mode (which is desired) less than energy of the second electromagnetic mode which (is undesired and parasitic, and) is orthogonal to the first electromagnetic mode.

FIG. 4 illustrates a flow diagram of one embodiment of a method 440 of operation of a resonator optical gyroscope including at least two polarization beam splitters (resonator optical gyroscope) 110A each of which is configured to suppress energy of the first electromagnetic mode (which is desired) less than energy of the second electromagnetic mode which (is undesired and parasitic, and) is orthogonal to the first electromagnetic mode. To the extent that the methods shown in any Figures are described herein as being implemented with any of the systems illustrated herein, it is to be understood that other embodiments can be implemented in other ways. Optionally, method 440 may be implemented by the resonant optical gyroscope described elsewhere herein, e.g., with respect to one or more of FIGS. 1A-3B, or other types of resonant optical gyroscopes. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440A, a CW optical signal, comprising a first mode and a second mode, is received, e.g., from an optical source 110A-11 at a first PBS 102A. The first mode is a TE or a TM mode, and the second mode is respectively a TM or a TE mode. In block 440B, a CCW optical signal, comprising the first mode and the second mode, is received, e.g., from an optical source 110A-11 at a second PBS 102A.

In block 440C, energy of the second mode of the CW optical signal is suppressed, e.g., by the first PBS 102A, more than energy of the first mode, e.g., by at least 30 dB. In block 440D, energy of the second mode of the CCW optical signal is suppressed, e.g., by the second PBS 102B, more than energy of the first mode, e.g., by at least 30 dB. Techniques for providing such suppression with a PBS are described elsewhere herein.

In block 440E, at least a portion of the CW optical signal, with a second mode whose energy has been suppressed more than the energy of the first mode of the CW optical signal, is received, e.g., from the first PBS 102A, at a travelling wave resonator system 110G. A CW or CCW optical signal with a suppressed second mode means that energy of the second mode of the optical signal is suppressed more than energy of the first mode, e.g., by at least thirty dB. In block 440F, at least a portion of the CCW optical signal, with a second mode whose energy has been suppressed more than the energy of the first mode of the CCW optical signal, is received, e.g., from the second PBS 102B, at the travelling wave resonator system 110G. A portion of the received portion of the CW optical signal, with the suppressed second mode, circulates clockwise in the travelling wave resonator of the travelling wave resonator system 110G. A portion of the received portion of the CCW optical signal, with the suppressed second mode, circulates counterclockwise in the travelling wave resonator of the travelling wave resonator system 110G.

In optional block 440G, energy of the second mode of the at least the portion of the CW optical signal is further suppressed, by the travelling wave resonator system 110G, more than energy of the first mode of the at least the portion of the CW optical signal, e.g., by at least 30 dB. In optional block 440H, energy of the second mode of the at least the portion of the CCW optical signal is further suppressed, by the travelling wave resonator system 110G, more than energy of the first mode of the at least the portion of the CCW optical signal, e.g., by at least 30 dB. Components of the travelling wave resonator system 110G and techniques of providing such suppression are described elsewhere herein.

In optional block 440I, energy of the first mode of a portion of the CW optical signal, received from the travelling wave resonator system, is further suppressed more than energy of the first mode, e.g., by at least 30 dB. In optional block 440J, energy of the first mode of a portion of the CCW optical signal, received from the travelling wave resonator system, is further suppressed more than energy of the first mode, e.g., by at least 30 dB.

In block 440K, in response to at least a portion of the CW optical signal (including energy of the second mode which is suppressed more than energy of the first mode of the CW optical signal) provided by the travelling wave resonator system 110G (or optionally by a third PBS 102C optically coupled to the travelling wave resonator system 110G), a carrier frequency of the CW optical signal, e.g., emitted from the optical source 110A-11, is adjusted to equal a resonant frequency of the travelling wave resonator in a CW direction. In block 440L, in response to at least a portion of the CCW optical signal (including energy of the second mode which is suppressed more than energy of the first mode of the CCW optical signal) provided by the travelling wave resonator system 110G (or optionally by a third PBS 102C optically coupled to the travelling wave resonator system 110G), a carrier frequency of the CCW optical signal, e.g., emitted from the optical source 110A-11, is adjusted to equal a resonant frequency of the travelling wave resonator in a CCW direction.

In block 440M, in response to either (a) a portion of the CW optical signal, with the second mode whose energy has been suppressed more than the energy of the first mode of the CW optical signal, e.g., received from the first PBS 102A, and a portion of the CCW optical signal, with the second mode whose energy has been suppressed more than the energy of the first mode of the CCW optical signal, e.g., received from the second PBS 102B, or (b) a portion of the CW optical signal, with the second mode whose energy has been suppressed more than the energy of the first mode of the CW optical signal, e.g., received from the travelling wave resonator system 110G, and a portion of the CCW optical signal, with the second mode whose energy has been suppressed more than the energy of the first mode of the CCW optical signal, e.g., received from the travelling wave resonator system 110G, determining a rate of rotation of the optical resonator gyroscope around a center axis of the travelling wave resonator, determining a rate of rotation of the optical resonator gyroscope around a center axis of the travelling wave resonator.

Terms of relative position as used in this application are defined based on a plane parallel to, or in the case of the term coplanar—the same plane as, the conventional plane or working surface of a layer, wafer, or substrate, regardless of orientation. The term "horizontal" or "lateral" as used in this application are defined as a plane parallel to the conventional plane or working surface of a layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a layer, wafer, or substrate, regardless of orientation. The term "coplanar" as used in this application is defined as a plane in the same plane as the conventional plane or working surface of a layer, wafer, or substrate, regardless of orientation.

EXEMPLARY EMBODIMENTS

Example 1 includes a method for reducing bias error in a resonator optical gyroscope, the method comprising: receiving, at a first polarizing beam splitter (PBS) from an optical source, a clockwise (CW) optical signal comprising a first mode and a second mode, wherein the first mode is a transverse electric (TE) mode or a transverse magnetic (TM) mode and the second mode is respectively the TM mode or the TE mode; receiving, at a second PBS from the optical source, a counterclockwise (CCW) optical signal comprising the first mode and the second mode; suppressing, with the first PBS, energy of the second mode of the CW optical signal more than energy of the first mode of the CW optical signal is suppressed by the first PBS; suppressing, with the second PBS, energy of the second mode of the CCW optical signal more than energy of the first mode of the CCW optical signal is suppressed by the second PBS; receiving, at a travelling wave resonator system from the first PBS, at least a portion of the CW optical signal with the second mode whose energy has been suppressed more than the energy of the first mode of the CW optical signal, wherein the travelling wave resonator system comprises a travelling wave resonator configured to propagate an optical signal in only one direction; receiving, at the travelling wave resonator system from the second PBS, at least a portion of the CCW optical signal with a second mode whose energy has been suppressed more than the energy of the first mode of the CCW optical signal; in response to at least a portion of the CW optical signal, with the second mode whose energy has been suppressed more than the energy of the first mode of the CW optical signal, provided by the travelling wave resonator system, adjusting a carrier frequency of the CW optical signal emitted from the optical source to equal a resonant frequency of the travelling wave resonator in a CW direction; in response to at least a portion of the CCW optical signal, with the second mode whose energy has been suppressed more than the energy of the first mode of the CCW optical signal, provided by the travelling wave resonator system, adjusting a carrier frequency of the CCW optical signal emitted from the optical source to equal a resonant frequency of the travelling wave resonator in a CCW direction; and in response to either (a) a portion of the CW optical signal, with the second mode whose energy has been suppressed more than the energy of the first mode of the CW optical signal received from the first PBS, and a portion of the CCW optical signal, with the second mode whose energy has been suppressed more than the energy of the first mode of the CCW optical signal received from the second PBS, or (b) a portion of the CW optical signal, with the second mode whose energy has been suppressed more than the energy of the first mode of the CW optical signal, received from the travelling wave resonator system, and a portion of the CCW optical signal, with the second mode whose energy has been suppressed more than the energy of the first mode of the CCW optical signal, received from the travelling wave resonator system, determining a rate of rotation of the resonator optical gyroscope around a center axis of the travelling wave resonator.

Example 2 includes the method of Example 1, further comprising: further suppressing, with the travelling wave resonator system, energy of the second mode of the at least the portion of the CW optical signal more than energy of the first mode of the at least the portion of the CW optical signal; and further suppressing, with the travelling wave resonator system, energy of the second mode of the at least the portion of the CCW optical signal more than energy of the first mode of the at least the portion of the CCW optical signal.

Example 3 includes the method of any of Examples 1-2, further comprising: further suppressing, with a third PBS, energy of the second mode of a portion of the CW optical signal more than energy of the first mode of the CW optical signal, received from the travelling wave resonator system; and further suppressing, with a fourth PBS, energy of the second mode of a portion of the CCW optical signal more than energy of the first mode of the CCW optical signal, received from the travelling wave resonator system; wherein (i) the portion of the CW optical signal received from the travelling wave resonator system and (ii) the portion of the CCW optical signal received from the travelling wave resonator system respectively comprise (x) the portion of the CW optical signal, with the second mode whose energy has been suppressed more than the energy of the first mode of the CW optical signal, received from the third PBS and (y) the portion of the CCW optical signal, with the second mode whose energy has been suppressed more than the energy of the first mode of the CCW optical signal, received from the fourth PBS.

Example 4 includes the method of Example 3, further comprising: further suppressing, with the travelling wave resonator system, energy of the second mode of the at least the portion of the CW optical signal more than energy of the first mode of the at least the portion of the CW optical signal; and further suppressing, with the travelling wave resonator system, energy of the second mode of the at least the portion of the CCW optical signal more than energy of the first mode of the at least the portion of the CCW optical signal.

Example 5 includes the method of any of Examples 1-4, wherein the first mode is a TMO mode and the second mode is a TEO mode.

Example 6 includes the method of any of Examples 1-5, wherein the first mode it a TEO mode and the second mode is a TMO mode.

Example 7 includes the method of any of Examples 1-6, wherein the rate of rotation is: $Q=(\Delta f*n*\lambda)/D$, where D is a diameter of the travelling wave resonator, is an average wavelength of the CW optical signal and the CCW optical signal, and n is a refractive index of cladding of the travelling wave resonator; wherein the travelling wave resonator is one of a disc resonator and a ring resonator.

Example 8 includes the method of any of Examples 1-7, wherein travelling wave resonator is one of a ring resonator, a disc resonator, and a racetrack resonator.

Example 9 includes the method of any of Examples 1-8, wherein adjusting a carrier frequency of each of the CW optical signal and the CCW optical signal comprises using a Pound-Drever-Hall technique.

Example 10 includes a resonator optical gyroscope mounted over a surface of a substrate, the resonator optical gyroscope comprising: an optical source configured to provide a clockwise (CW) optical signal and a counterclockwise (CCW) optical signal, wherein each of the CW optical signal and the CCW optical signal comprise a first mode and a second mode, wherein the first mode is a transverse electric (TE) mode or a transverse magnetic (TM) mode and the second mode is respectively the TM mode or the TE mode; a first polarizing beam splitter (PBS) optically coupled to the optical source, configured to receive the CW optical signal, and configured to suppress energy of the second mode of the CW optical signal more than energy of the first mode of the CW optical signal; a second polarizing beam splitter optically coupled to the optical source, configured to receive the CCW optical signal, and configured to suppress energy of the second mode of the CW optical signal more than energy of the first mode of the CW optical signal; a travelling wave resonator system comprising a first planar optical transmission line, a second planar optical transmission line, a travelling wave resonator, a first port optically coupled to a first end of the first planar optical transmission line, a second port optically coupled to a second end of the first planar optical transmission line, a third port optically coupled to a first end of a second optical transmission line, and a fourth port optically coupled to a second end of the second optical transmission line, wherein the travelling wave resonator is configured to propagate an optical signal in only one direction, wherein the first port is optically coupled to the first PBS, and wherein the second port is optically coupled to the second PBS; a CW detector circuit optically coupled to the third port and configured to provide a CW control signal to the optical source; a CCW detector circuit optically coupled to the fourth port configured to provide a CCW control signal to the optical source; wherein in response to the CW control signal, the optical source is further configured to adjust a carrier frequency of the CW optical signal to equal to a resonant frequency of the travelling wave resonator in a CW direction and use the CCW control signal to adjust a carrier frequency of the CCW optical signal to equal a resonant frequency of the travelling wave resonator in a CCW direction; and a beat detector circuit either (a) optically coupled to the first port and the second port and configured to receive a portion of the CW optical, with the second mode whose energy has been suppressed more than the energy of the first mode of the CW optical signal received from the first PBS and to receive a portion of the CCW optical signal, with the second mode whose energy has been suppressed more than the energy of the first mode of the CW optical signal, received from the second PBS or (b) optically coupled to the third port and the fourth port and configured to receive a portion of a CW optical signal, with the second mode whose energy has been suppressed more than the energy of the first mode of the CW optical signal, received from the third port and a portion of a CCW optical signal, with the second mode whose energy has been suppressed more than the energy of the first mode of the CW optical signal, received from the fourth port, and further configured to determine a rate of rotation of the resonator optical gyroscope around a rotation axis based upon a difference of a carrier frequency of a portion of the CW optical signal received by the beat detector circuit and a carrier frequency of a portion of the CCW optical signal received by the beat detector circuit.

Example 11 includes the resonator optical gyroscope of Example 10, wherein at least one of the first planar optical transmission line, the second planar optical transmission line, and the travelling wave resonator are configured to suppress energy of the second mode of the at least the portion of the CW optical signal more than energy of the first mode of the at least the portion of the CW optical signal and to suppress energy of the second mode of the at least the portion of the CCW optical signal more than energy of the first mode of the at least the portion of the CCW optical signal.

Example 12 includes the resonator optical gyroscope of Example 11, wherein the first mode is a TM mode and the second mode is a TE mode; wherein the at least one of the first planar optical transmission line, the second planar optical transmission line, and the travelling wave resonator comprise: planar optical waveguide comprising: a core having a core index of refraction and a thickness which is at least ten percent of a free space wavelength of an optical signal configured to be propagated in such planar optical waveguide, wherein the thickness means a dimension along an axis perpendicular to the surface of the substrate; and cladding having a cladding index of refraction and surrounding the core and over the surface of the substrate; wherein the cladding index of refraction is smaller than the core index of refraction; at least one sidewall of the cladding, wherein a sidewall means a surface, of the cladding, perpendicular to the surface of the substrate; at least one Bragg grating, wherein each Bragg grating is in a unique sidewall of the cladding; and the rotation axis around which the resonator optical gyroscope is configured to be rotated; wherein a period of each Bragg grating period is greater than the free space wavelength of the optical signal configured to propagate in the planar optical waveguide divided by two times an index of refraction of the TE mode; wherein the period of a Bragg grating is less than the free space wavelength of the optical signal configured to propagate in the planar optical waveguide divided by two times an index of refraction of the TM mode.

Example 13 includes the resonator optical gyroscope of Example 12, wherein the TM mode is a TM0 mode and the TE mode is a TE0 mode.

Example 14 includes the resonator optical gyroscope of any of Examples 12-13, wherein the core comprises silicon nitride and the cladding comprises silicon dioxide.

Example 15 includes the resonator optical gyroscope of any of Examples 12-14, wherein the core has a width that is less than seven free space wavelengths of the optical signal configured to be propagated in the planar optical waveguide, wherein the width means a dimension along another axis substantially perpendicular to the axis of the thickness and parallel with a surface of the substrate.

Example 16 includes the resonator optical gyroscope of Example 15, wherein the width is a diameter of the travelling wave resonator which is a disc resonator.

Example 17 includes the resonator optical gyroscope of any of Examples 10-16, wherein the rate of rotation is:

$$\Omega = (\Delta f * n * \lambda)/D,$$

where D is a diameter of the travelling wave resonator, λ is an average wavelength of the CW optical signal and the CCW optical signal, and n is a refractive index of cladding; wherein the travelling wave resonator is one of a disc resonator and a ring resonator.

Example 18 includes the resonator optical gyroscope of any of Examples 10-17, wherein travelling wave resonator is one of a ring resonator, a disc resonator, and a racetrack resonator.

Example 19 includes the resonator optical gyroscope of any of Examples 10-18, wherein adjusting the carrier frequency of each of the CW optical signal and the CCW optical signal comprises using a Pound-Drever-Hall technique.

Example 20 includes the resonator optical gyroscope of any of Examples 10-19, wherein the first mode is a TE0 mode and the second mode is a TM0 mode.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for reducing bias error in a resonator optical gyroscope, the method comprising:
   receiving, at a first polarizing beam splitter (PBS) from an optical source, a clockwise (CW) optical signal comprising a first mode and a second mode, wherein the first mode is a transverse electric (TE) mode or a transverse magnetic (TM) mode and the second mode is respectively the TM mode or the TE mode;
   receiving, at a second PBS from the optical source, a counterclockwise (CCW) optical signal comprising the first mode and the second mode;

suppressing, with the first PBS, energy of the second mode of the CW optical signal more than energy of the first mode of the CW optical signal is suppressed by the first PBS;

suppressing, with the second PBS, energy of the second mode of the CCW optical signal more than energy of the first mode of the CCW optical signal is suppressed by the second PBS;

receiving, at a travelling wave resonator system from the first PBS, at least a portion of the CW optical signal with the second mode whose energy has been suppressed more than the energy of the first mode of the CW optical signal, wherein the travelling wave resonator system comprises a travelling wave resonator configured to propagate an optical signal in only one direction;

receiving, at the travelling wave resonator system from the second PBS, at least a portion of the CCW optical signal with the second mode whose energy has been suppressed more than the energy of the first mode of the CCW optical signal;

in response to at least a portion of the CW optical signal, with the second mode whose energy has been suppressed more than the energy of the first mode of the CW optical signal, provided by the travelling wave resonator system, adjusting a carrier frequency of the CW optical signal emitted from the optical source to equal a resonant frequency of the travelling wave resonator in a CW direction;

in response to at least a portion of the CCW optical signal, with the second mode whose energy has been suppressed more than the energy of the first mode of the CCW optical signal, provided by the travelling wave resonator system, adjusting a carrier frequency of the CCW optical signal emitted from the optical source to equal a resonant frequency of the travelling wave resonator in a CCW direction; and in response to either (a) a portion of the CW optical signal, with the second mode whose energy has been suppressed more than the energy of the first mode of the CW optical signal received from the first PBS, and a portion of the CCW optical signal, with the second mode whose energy has been suppressed more than the energy of the first mode of the CCW optical signal received from the second PBS, or (b) a portion of the CW optical signal, with the second mode whose energy has been suppressed more than the energy of the first mode of the CW optical signal, received from the travelling wave resonator system, and a portion of the CCW optical signal, with the second mode whose energy has been suppressed more than the energy of the first mode of the CCW optical signal, received from the travelling wave resonator system, determining a rate of rotation of the resonator optical gyroscope around a center axis of the travelling wave resonator.

2. The method of claim 1, further comprising:
further suppressing, with the travelling wave resonator system, energy of the second mode of the at least the portion of the CW optical signal more than energy of the first mode of the at least the portion of the CW optical signal; and
further suppressing, with the travelling wave resonator system, energy of the second mode of the at least the portion of the CCW optical signal more than energy of the first mode of the at least the portion of the CCW optical signal.

3. The method of claim 1, further comprising:
further suppressing, with a third PBS, energy of the second mode of a portion of the CW optical signal more than energy of the first mode of the CW optical signal, received from the travelling wave resonator system; and
further suppressing, with a fourth PBS, energy of the second mode of a portion of the CCW optical signal more than energy of the first mode of the CCW optical signal, received from the travelling wave resonator system;
wherein (i) the portion of the CW optical signal received from the travelling wave resonator system and (ii) the portion of the CCW optical signal received from the travelling wave resonator system respectively comprise (x) the portion of the CW optical signal, with the second mode whose energy has been suppressed more than the energy of the first mode of the CW optical signal, received from the third PBS and (y) the portion of the CCW optical signal, with the second mode whose energy has been suppressed more than the energy of the first mode of the CCW optical signal, received from the fourth PBS.

4. The method of claim 3, further comprising:
further suppressing, with the travelling wave resonator system, energy of the second mode of the at least the portion of the CW optical signal more than energy of the first mode of the at least the portion of the CW optical signal; and
further suppressing, with the travelling wave resonator system, energy of the second mode of the at least the portion of the CCW optical signal more than energy of the first mode of the at least the portion of the CCW optical signal.

5. The method of claim 1, wherein the first mode is a TM0 mode and the second mode is a TE0 mode.

6. The method of claim 1, wherein the first mode is a TE0 mode and the second mode is a TM0 mode.

7. The method of claim 1, wherein the rate of rotation is:

$$\Omega = (\Delta f * n * \lambda)/D,$$

where $\Delta f$ is a difference of a carrier frequency of the CW optical signal and a carrier frequency of the CCW optical signal, D is a diameter of the travelling wave resonator, X is an average wavelength of the CW optical signal and the CCW optical signal, and n is a refractive index of cladding of the travelling wave resonator;
wherein the travelling wave resonator is one of a disc resonator and a ring resonator.

8. The method of claim 1, wherein travelling wave resonator is one of a ring resonator, a disc resonator, and a racetrack resonator.

9. The method of claim 1, wherein adjusting a carrier frequency of each of the CW optical signal and the CCW optical signal comprises using a Pound-Drever-Hall technique.

10. A resonator optical gyroscope mounted over a surface of a substrate, the resonator optical gyroscope comprising:
an optical source configured to provide a clockwise (CW) optical signal and a counterclockwise (CCW) optical signal, wherein each of the CW optical signal and the CCW optical signal comprise a first mode and a second mode, wherein the first mode is a transverse electric (TE) mode or a transverse magnetic (TM) mode and the second mode is respectively the TM mode or the TE mode;

a first polarizing beam splitter (PBS) optically coupled to the optical source, configured to receive the CW optical signal, and configured to suppress energy of the second mode of the CW optical signal more than energy of the first mode of the CW optical signal;

a second polarizing beam splitter (PBS) optically coupled to the optical source, configured to receive the CCW optical signal, and configured to suppress energy of the second mode of the CCW optical signal more than energy of the first mode of the CCW optical signal;

a travelling wave resonator system comprising a first planar optical transmission line, a second planar optical transmission line, a travelling wave resonator, a first port optically coupled to a first end of the first planar optical transmission line, a second port optically coupled to a second end of the first planar optical transmission line, a third port optically coupled to a first end of a second optical transmission line, and a fourth port optically coupled to a second end of the second optical transmission line, wherein the travelling wave resonator is configured to propagate an optical signal in only one direction, wherein the first port is optically coupled to the first PBS, and wherein the second port is optically coupled to the second PBS;

a CW detector circuit optically coupled to the third port and configured to provide a CW control signal to the optical source;

a CCW detector circuit optically coupled to the fourth port configured to provide a CCW control signal to the optical source;

wherein in response to the CW control signal, the optical source is further configured to adjust a carrier frequency of the CW optical signal to equal to a resonant frequency of the travelling wave resonator in a CW direction and use the CCW control signal to adjust a carrier frequency of the CCW optical signal to equal a resonant frequency of the travelling wave resonator in a CCW direction; and a beat detector circuit either (a) optically coupled to the first port and the second port and configured to receive a portion of the CW optical, with the second mode whose energy has been suppressed more than the energy of the first mode of the CW optical signal received from the first PBS and to receive a portion of the CCW optical signal, with the second mode whose energy has been suppressed more than the energy of the first mode of the CCW optical signal, received from the second PBS or (b) optically coupled to the third port and the fourth port and configured to receive a portion of a CW optical signal, with the second mode whose energy has been suppressed more than the energy of the first mode of the CW optical signal, received from the third port and a portion of a CCW optical signal, with the second mode whose energy has been suppressed more than the energy of the first mode of the CCW optical signal, received from the fourth port, and further configured to determine a rate of rotation of the resonator optical gyroscope around a rotation axis based upon a difference of a carrier frequency of a portion of the CW optical signal received by the beat detector circuit and a carrier frequency of a portion of the CCW optical signal received by the beat detector circuit.

11. The resonator optical gyroscope of claim 10, wherein at least one of the first planar optical transmission line, the second planar optical transmission line, and the travelling wave resonator are configured to suppress energy of the second mode of the at least the portion of the CW optical signal more than energy of the first mode of the at least portion of the CW optical signal and to suppress energy of the second mode of the at least the portion of the CCW optical signal more than energy of the first mode of the at least the portion of the CCW optical signal.

12. The resonator optical gyroscope of claim 11, wherein the first mode is a TM mode and the second mode is a TE mode;

wherein the at least one of the first planar optical transmission line, the second planar optical transmission line, and the travelling wave resonator comprise:
a planar optical waveguide comprising:
a core having a core index of refraction and a thickness which is at least ten percent of a free space wavelength of an optical signal configured to be propagated in such planar optical waveguide, wherein the thickness means a dimension along an axis perpendicular to the surface of the substrate; and
a cladding having a cladding index of refraction and surrounding the core and over the surface of the substrate;
wherein the cladding index of refraction is smaller than the core index of refraction;
at least one sidewall of the cladding, wherein a sidewall means a surface, of the cladding, perpendicular to the surface of the substrate;
at least one Bragg grating, wherein each Bragg grating is in a unique sidewall of the cladding; and
the rotation axis around which the resonator optical gyroscope is configured to be rotated;
wherein a Bragg grating period is greater than the free space wavelength of the optical signal configured to propagate in the planar optical waveguide divided by two times an index of refraction of a TEO mode;
wherein the Bragg grating period is less than the free space wavelength of the optical signal configured to propagate in the planar optical waveguide divided by two times an index of refraction of a TMO mode.

13. The resonator optical gyroscope of claim 12, wherein the core comprises silicon nitride and the cladding comprises silicon dioxide.

14. The resonator optical gyroscope of claim 12, wherein the core has a width that is less than seven free space wavelengths of the optical signal configured to be propagated in the planar optical waveguide, wherein the width means a dimension along another axis substantially perpendicular to the axis of the thickness and parallel with a surface of the substrate.

15. The resonator optical gyroscope of claim 14, wherein the width is a diameter of the travelling wave resonator which is a disc resonator.

16. The resonator optical gyroscope of claim 10, wherein the rate of rotation is:

$$\Omega = (\Delta f * n * \lambda)/D,$$

where D is a diameter of the travelling wave resonator, $\Delta f$ is a difference of a carrier frequency of the CW optical signal and a carrier frequency of the CCW optical signal, $\lambda$ is an average wavelength of the CW optical signal and the CCW optical signal, and n is a refractive index of cladding;

wherein the travelling wave resonator is one of a disc resonator and a ring resonator.

17. The resonator optical gyroscope of claim 10, wherein travelling wave resonator is one of a ring resonator, a disc resonator, and a racetrack resonator.

18. The resonator optical gyroscope of claim 10, wherein adjusting the carrier frequency of each of the CW optical signal and the CCW optical signal comprises using a Pound-Drever-Hall technique.

19. The resonator optical gyroscope of claim 10, wherein the first mode is a TE0 mode and the second mode is a TM0 mode.

* * * * *

UNITED STATES PATENT AND TRADEMARK OFFICE
CERTIFICATE OF CORRECTION

PATENT NO. : 12,305,989 B2  
APPLICATION NO. : 18/166792  
DATED : May 20, 2025  
INVENTOR(S) : Wu et al.

Page 1 of 1

It is certified that error appears in the above-identified patent and that said Letters Patent is hereby corrected as shown below:

In the Claims

At Column 20, Line 37, please replace "TMO" with --TM0-- between "is a" and "mode".

At Column 20, Line 37, please replace "TEO" with --TE0-- between "is a" and "mode".

At Column 20, Line 38, please replace "isa TEO" with --is a TE0-- between "first mode" and "mode and".

At Column 20, Line 39, please replace "TMO" with --TM0-- between "is a" and "mode".

At Column 20, Line 48, please replace "X" with --λ-- between "wave resonator," and "is an average".

At Column 22, Line 38, please replace "TEO" with --TE0-- between "of a" and "mode".

At Column 22, Line 42, please replace "TMO" with --TM0-- between "of a" and "mode".

At Column 23, Line 9, please replace "TEO" with --TE0-- between "is a" and "mode".

At Column 23, Line 9, please replace "TMO" with --TM0-- between "is a" and "mode".

Signed and Sealed this  
Twenty-fourth Day of June, 2025

Coke Morgan Stewart  
*Acting Director of the United States Patent and Trademark Office*